Aug. 2, 1938.  A. NOVICK  2,125,307
BAG MAKING MACHINE
Filed July 13, 1934  8 Sheets-Sheet 1
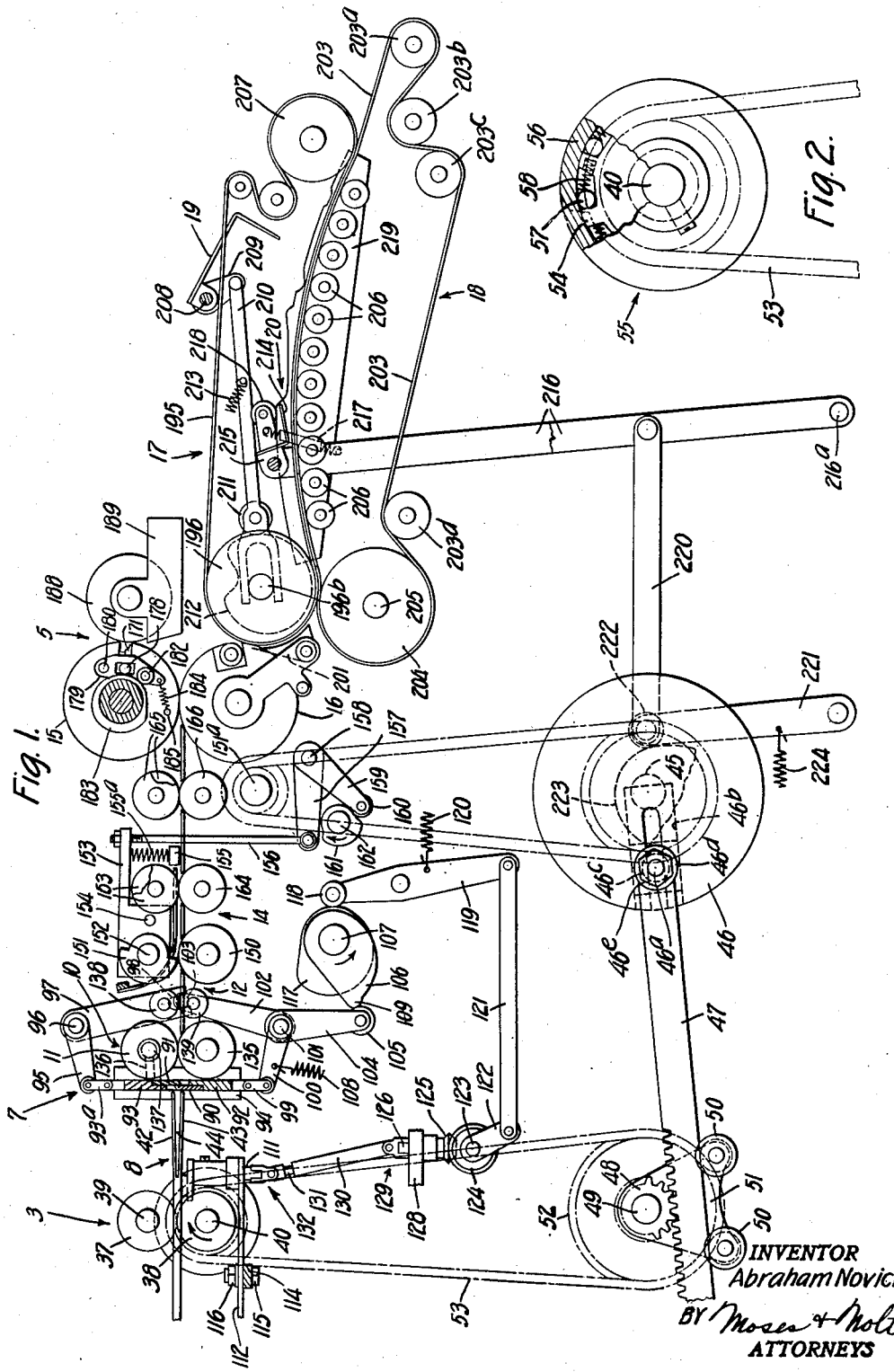
INVENTOR
Abraham Novick.
BY Moses & Nolte
ATTORNEYS Aug. 2, 1938.  A. NOVICK  2,125,307
BAG MAKING MACHINE
Filed July 13, 1934  8 Sheets-Sheet 2
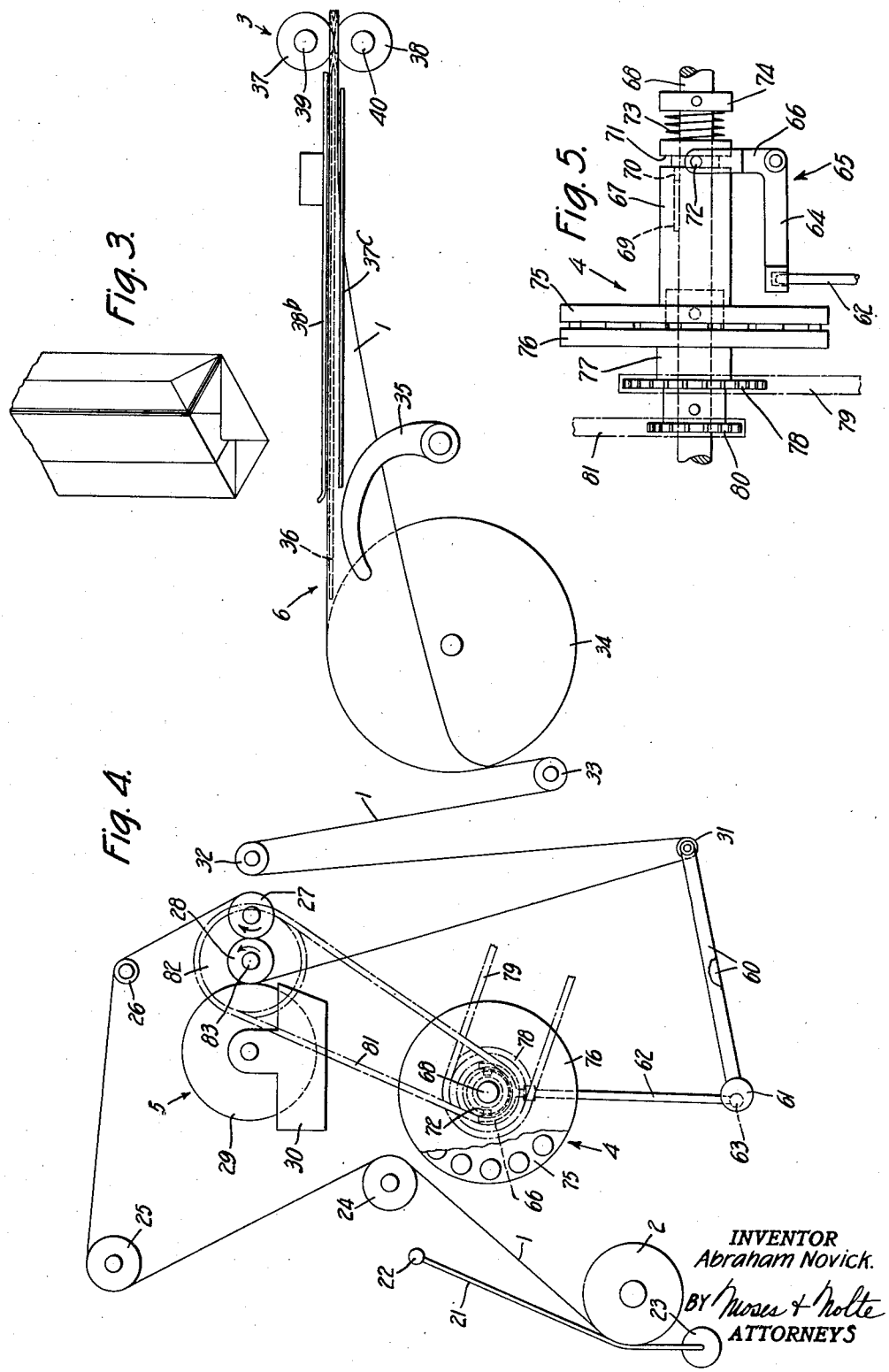
INVENTOR
Abraham Novick.
BY Moses + Nolte
ATTORNEYS

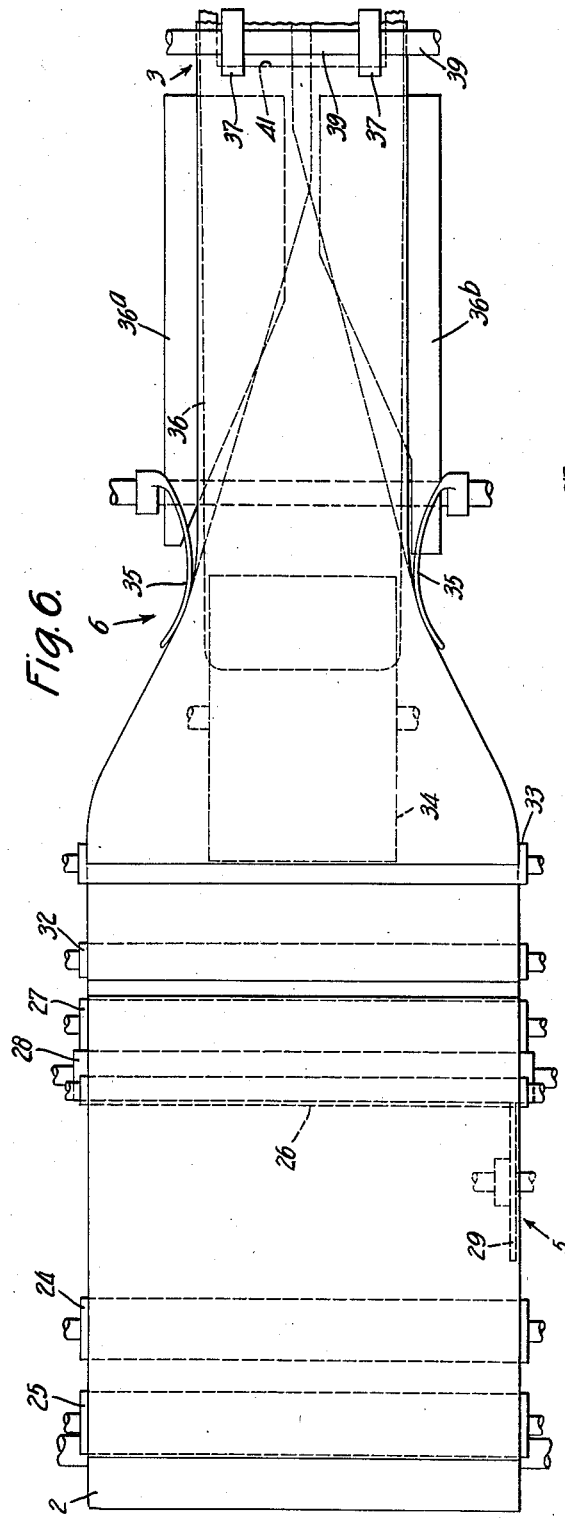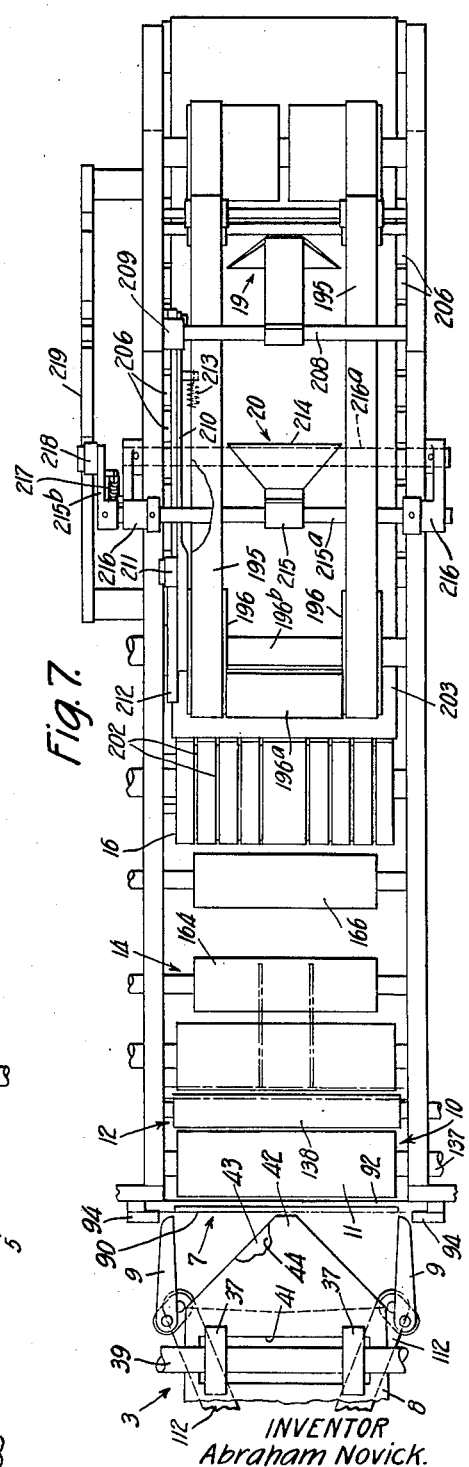

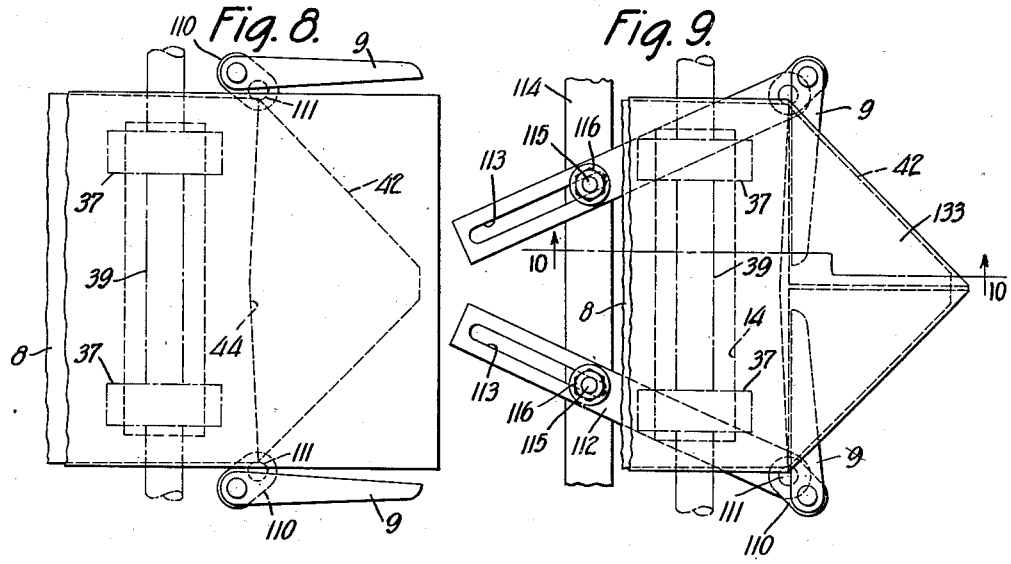
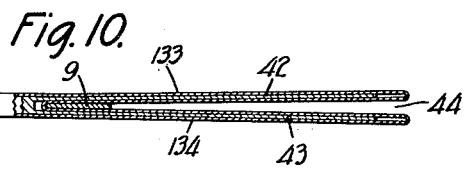
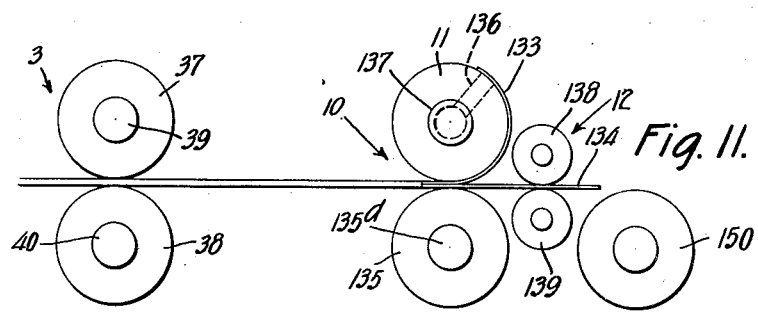
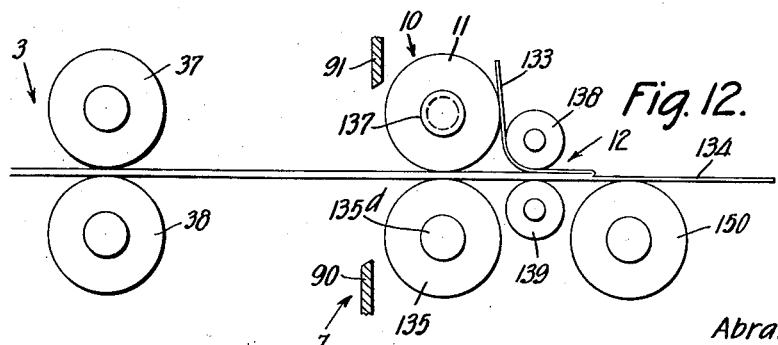

Aug. 2, 1938.  A. NOVICK  2,125,307
BAG MAKING MACHINE
Filed July 13, 1934  8 Sheets-Sheet 5
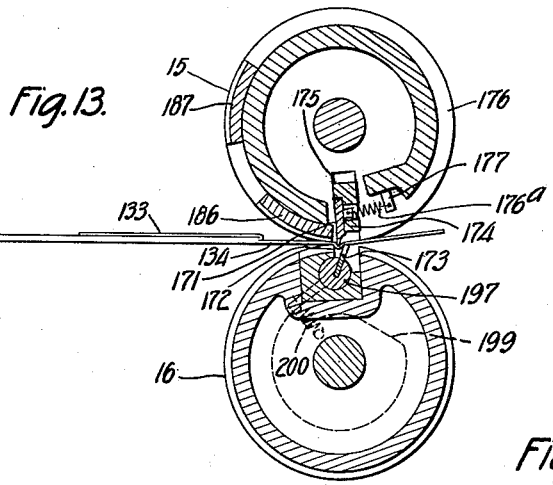
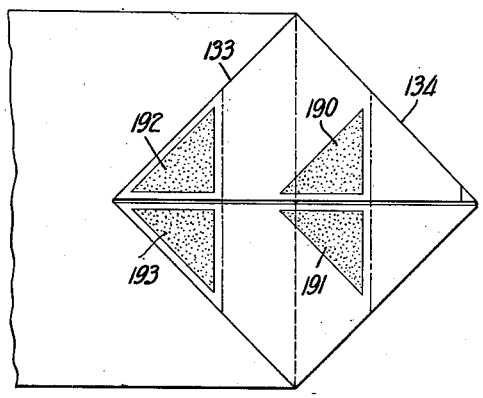
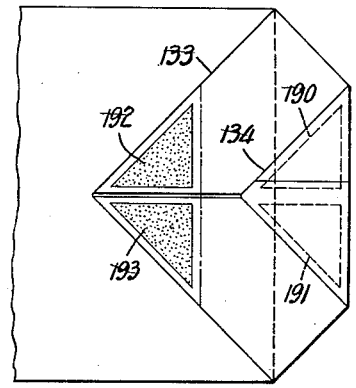
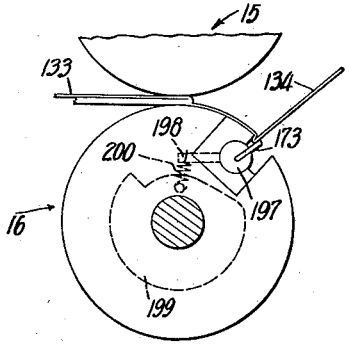
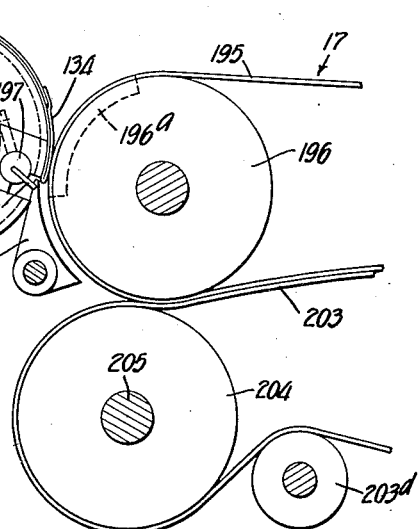
INVENTOR
Abraham Novick.
BY Moses & Nolte
ATTORNEYS Aug. 2, 1938.   A. NOVICK   2,125,307
BAG MAKING MACHINE
Filed July 13, 1934   8 Sheets-Sheet 6
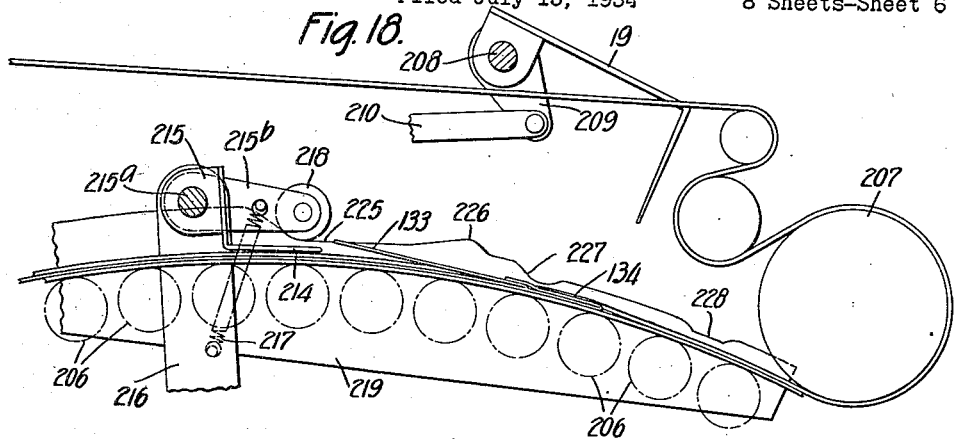
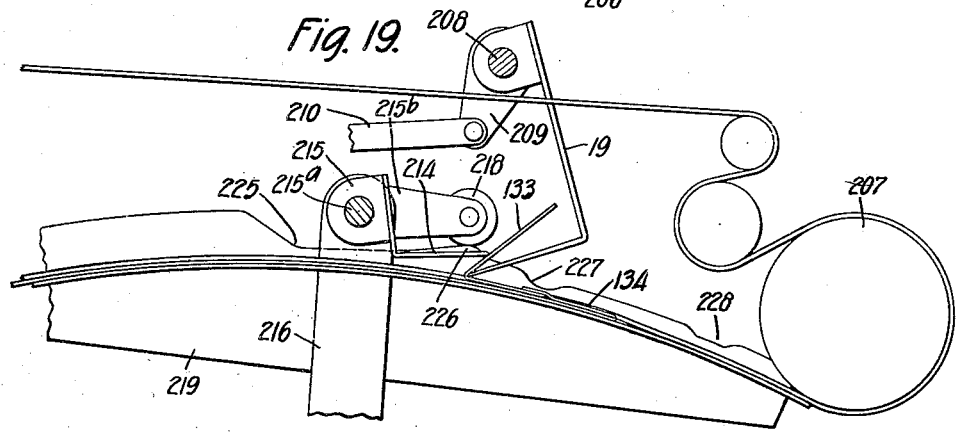
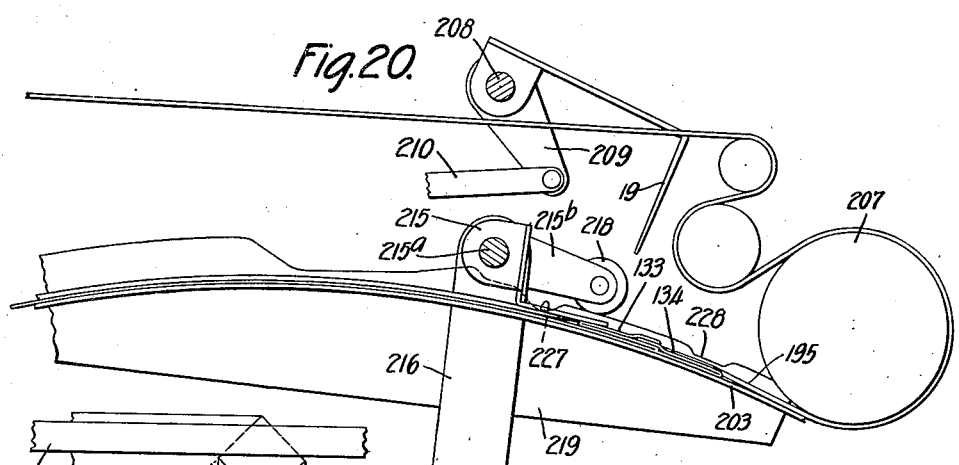
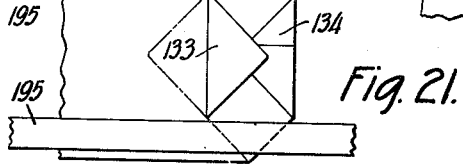
INVENTOR
Abraham Novick.
BY Moses & Nolte
ATTORNEYS

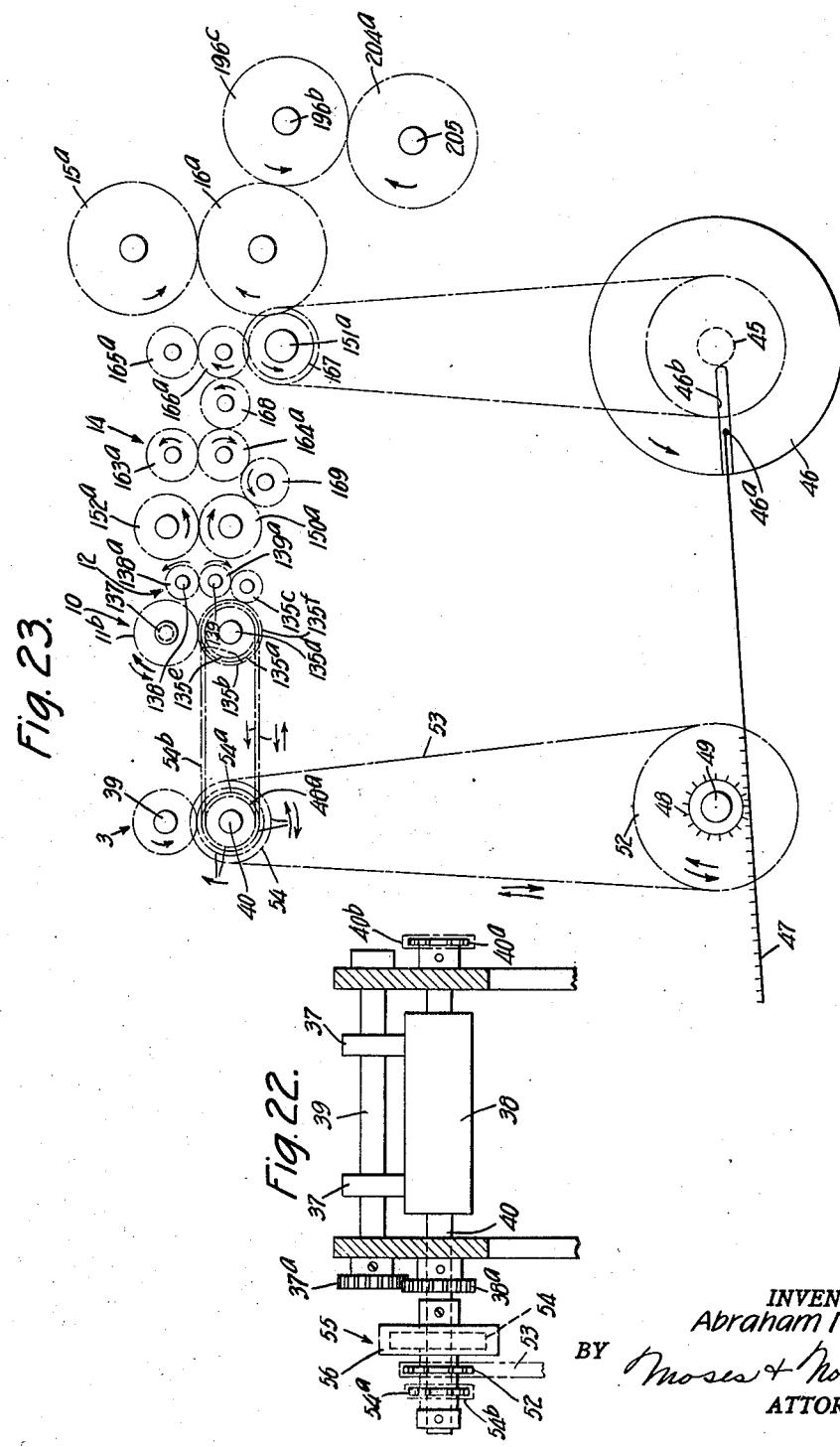

Aug. 2, 1938.　　　　　A. NOVICK　　　　　2,125,307

BAG MAKING MACHINE

Filed July 13, 1934　　　　8 Sheets-Sheet 8

INVENTOR.
Abraham Novick.
BY Moses & Nolte
ATTORNEYS.

Patented Aug. 2, 1938

2,125,307

UNITED STATES PATENT OFFICE 2,125,307

BAG MAKING MACHINE

Abraham Novick, Flushing, N. Y., assignor to F. L. Smithe Machine Co., Inc., New York, N. Y., a corporation of New York Application July 13, 1934, Serial No. 734,977

39 Claims. (Cl. 93—14)

This invention relates to bag making machines and is in the nature of an improvement upon the invention of my pending application, Serial No. 669,578, filed May 5, 1933 for Manufacture of satchel bottom bags. The present application is a continuation-in-part of Serial No. 669,578.

In common with the invention of said application this invention has for an object to provide means for manufacturing bags out of material the folding of which is difficult to control such, for instance, as "Cellophane", although it may be used in making bags of paper of any kind.

In accordance with one feature of the present invention the bag web is advanced intermittently, being halted for the severing of a blank from the leading end of the web and for the folding or tucking in of the corners at the forward end of the web portion from which the blank has just been severed.

Another feature of the invention relates to the provision of means for controlling the supply of web to the intermittent feeding mechanism from a web reel, whereby it is rendered unnecessary for the web to overcome the inertia of the reel when it is advanced by the intermittent feeding mechanism.

A further feature of the invention has to do with the folding over of one of the bottom tabs of the bag blank onto another. In accordance with this feature a folding plate is momentarily projected into proximity to the advancing tab and a relatively rapidly moving folder is caused to overtake the tab from behind and form it about the plate. The plate is then quickly withdrawn, out of the way of the advancing folded tab, and the folder, continuing its advance, presses the tab down firmly to form a good adhesive union between it and the underlying tab. This improved folding mechanism obviates the need for relying upon a crease line in the upper tab and the need for forming such a crease line. This latter advantage is an important one since the forming of a crease necessarily involves the applying of pressure by the creasing bar to the body of the bag as well as to the overlying tab. The fold of the upper tab is more sharply defined than heretofore.

Other objects and advantages will hereinafter appear.

In the drawings forming a part of this specification and showing an illustrative embodiment of the invention, Fig. 1 is a fragmentary sectional side elevation illustrating the principal parts of the machine;

Fig. 2 is a detail view, partly broken away, illustrating a portion of the mechanism for feeding the web intermittently, looking in the direction opposite to that of Fig. 1;

Fig. 3 is a fragmentary perspective view of a finished bag made in accordance with the present invention;

Fig. 4 is a view in side elevation illustrating the principal parts of the web supplying and tube forming mechanisms which act upon the web in advance of the mechanism illustrated in Fig. 1;

Fig. 5 is a plan view of a portion of the machine shown in Fig. 4;

Fig. 6 is a fragmentary plan view showing the mechanism illustrated in Fig. 4;

Fig. 7 is a fragmentary plan view of the mechanism illustrated in Fig. 1, the showing at the left-hand extremity of Fig. 7 overlapping slightly the showing at the right-hand extremity of Fig. 6;

Fig. 8 is a fragmentary plan view illustrating the corner inserting or tucking mechanism in one phase of its operation;

Fig. 9 is a view generally similar to Fig. 8 illustrating the corner tucking mechanism in another phase of its operation;

Fig. 10 is an elevational view, partly in section, illustrating the forming plate of Figs. 8 and 9 and one of the tucking plates inserted therein;

Figs. 11 and 12 are detail views showing the mechanism for turning back the upper tab formed by the corner tucking operation;

Fig. 13 is a view in sectional elevation illustrating the tucking into a gripper of the lower tab;

Fig. 14 illustrates the condition of the blank just prior to the folding over of the lower tab;

Fig. 15 illustrates the same blank just after the folding over of the lower tab;

Fig. 16 is a fragmentary view in sectional elevation showing the blank being carried forward by the gripper into which the lower tab has been tucked;

Fig. 17 is a fragmentary view in sectional elevation illustrating the parts a little farther advanced than in Fig. 16 and illustrating a portion of the conveyor mechanism to which the blank is delivered after the lower tab has been folded;

Fig. 18 is a fragmentary view in sectional elevation illustrating the means for folding over and pressing down the upper tab and for moving the blank while such operations are being performed;

Fig. 19 is a view similar to Fig. 18 showing the parts in a more advanced phase;

Fig. 20 is a view similar to Figs. 18 and 19, showing the parts at a still farther advanced stage of their operations upon the blank;

Fig. 21 is a fragmentary diagrammatic plan view showing the finished bag folded as in Fig. 20 and about to be discharged from the machine;

Fig. 22 is a fragmentary view in elevation illustrating the driving mechanism of the tube feeding couple;

Fig. 23 is a diagrammatical view in elevation illustrating the driving gearing of the principal web and blank feeding elements;

Figure 24:
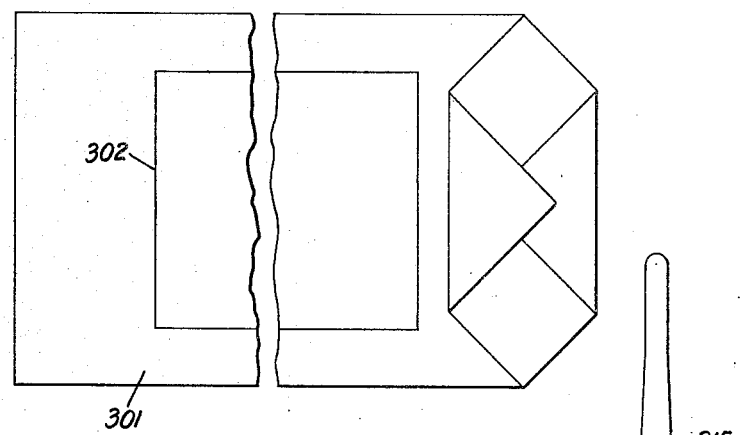
Fig. 24 is a plan view of a bag having a printed area represented thereon.

Before describing in detail the various operating instrumentalities of the illustrative embodiment of the invention shown in the drawings, the chief elements will be briefly referred to in the order in which they operate upon the work in order that a comprehensive idea may be had of the functions of the principal parts and of the purpose and operation of the machine as a whole.

A work web 1, which may be of "Cellophane" or of any suitable bag material such as paper, is supplied from a reel 2, (Figs. 4 and 6). The web is drawn forward intermittently by a feeder 3. (Figs. 1, 4, 6, 7, 11, 12, 23.) It is preferable not to require the feeder 3 to draw the web directly from the reel 2, since such operation would require the inertia of the reel to be overcome at the beginning of each feeding operation. The inertia of the reel acting in direct opposition to the feeder 3 would be apt to cause slipping of the web relative to the feeder, with a consequent production of bags which would be defective because of being of less length than intended.

Provision is accordingly made of a slack producing mechanism 4 between the reel 2 and the feeder 3, for drawing the web from the reel 2 and maintaining a loop of web available which may be drawn upon by the feeder 3 and replenished by smooth feeding action of long duration. One longitudinal margin of the web is fed in contact with a gumming mechanism 5 by the slack producing mechanism 4, the feeding of the web past the gumming disc being at a substantially uniform rate.

Just in advance of the feeder 3 provision is made of tube forming mechanism 6 for folding the web over into tube form and pasting the gummed margin against the opposite margin of the web. The mechanisms thus far referred to are illustrated generally in Figs. 4 and 6.

The illustration of Figs. 1 and 7 overlap slightly the illustrations of Figs. 4 and 6, and disclose the further treatment of the web and the blanks formed therefrom. The leading end of the web tube is advanced by the feeder 3 through a cutting mechanism 7 which is caused to operate to sever the leading portion from the tube during the period when the tube is at rest. After the cutting mechanism 7 has thus operated to sever a bag blank from the tube, the leading end of the remainder of the tube stands adjacent to the cutting mechanism and encircles a slotted forming plate 8, which plate forms a part of the tube forming mechanism 6. Tucker blades 9 (Figs. 7, 8, 9 and 10), are then oscillated to tuck the forward corners of the blank into the slot of the forming plate. As soon as the tucker blades are withdrawn from the path of web movement, the feeder 3 acts to advance the web a blank length.

The leading end of the tube passes through a tab folder 10, (Figs. 1, 7, 11, 12 and 13), comprising a suction roller 11 which raises an upper tab of the leading end of the tube while leaving a lower tab free to continue along the normal path of blank movement. The leading end of the tube passes next through a roller couple 12 for completing the folding back of the upper tab and for turning it down substantially against the body of the tube. The tube again comes to rest and the leading blank is severed from the forward end of the tube by the cutting mechanism 7. (Figs. 1, 7 and 12.)

The severed blank is then advanced through a continuously operated feeding mechanism 14, (Figs. 1, 7, 9, and 23), and is advanced continuously through the ensuing operations. The blank is advanced past a gumming and tucking roller 15 (Figs. 1, 13 and 16), whereby it is applied to a roller 16 which either carries or has associated with it means for folding and pressing the forward end of the lower tab over against the blank. The blank passes thence between continuously running conveyors 17 and 18 (Figs. 1 and 17).

During such advancement a tucking blade 19, (Figs. 1, 7, 18, 19 and 20) swings momentarily into proximity to the advancing blank, and a folding and ironing mechanism 20 (Figs. 1 and 7), the operative portion of which travels at a higher speed than the conveyors 17 and 18, swings forward over the blank and folds the trailing corners of the upper tab around the tucking blade 19. The tucking blade 19 is then quickly retracted and the folding and pressing device is caused to continue its forward movement and to approach the blank to press and iron down the forward tab. This completes the manufacturing of the bag, the completed bag being delivered to any suitable receiver by the conveyors 17 and 18.

The illustrated machine will now be described more completely. A band 21 (Fig. 4) is suspended from a fixed support 22 and provided with a weight 23 whereby it is held taut against the surface of the reel 2 and caused to act as a brake for preventing overrunning of the reel. The web 1 passes from the reel 2 around guide rollers 24, 25 and 26 (Figs. 4 and 6) and thence around and between feed rollers 27 and 28. The feed roller 28 presses a margin of the web against a gumming disc 29 which runs in a gum pot 30. The web, after leaving the roller 28 and the disc 29, passes around a movable roller 31 and thence around guide rollers 32 and 33. The web is then caused to travel over a cylinder 34 of substantially less length than the width of the web and between deflecting arms 35 which turn the side portions of the web downward around an internal forming plate 36 and into a condition adapting the side portions to be acted upon by stationary folding plates 36$^a$ and 36$^b$, which act to overlap opposite side margins of the web to form a tube. A hold-down plate 38$^b$ is disposed above the forming plate 36 to assist in guiding the web 1 at the folding station.

The formed tube passes next to an intermittent feeder 3 (Figs. 1, 4, 6, 7, 11, 12, 23), comprising opposed pairs of feed rollers 37 and 38 which are mounted, respectively upon shafts 39 and 40. The feed rollers act upon the web through an opening 41 (Figs. 6 and 7) which is provided in the forming plate 8. The forming plate 8 is triangular in form at its forward end, and this triangular portion is composed of parallel relatively thin plates 42 and 43 between which a slot 44 intervenes (Figs. 1, 8 and 10).

The feed roller 38, (Figs. 1, 4, 11, 12 and 22) which forms one element of the feeder 3 is arranged to be intermittently driven. A constantly rotating shaft 45 (Figs. 1 and 23), has fast upon it a disc 46 to which a rack bar 47 is eccentrically pivoted. The rack bar meshes with a pinion 48 fast upon a shaft 49, and is held in engagement with the pinion by means of a pair of supporting rollers 50 (Fig. 1) which are carried by a sector plate 51 loose on the shaft 49. The shaft 49 also has fast upon it a sprocket 52 which drives a chain 53 (Figs. 1, 2, 22 and 23). The chain 53 in turn drives one element 54 of a ball clutch 55. The element 54 is loose upon the shaft 40. Another element 56 (Figs. 2 and 22), of the clutch 55 is fast upon the shaft 40. Balls 57 (Fig. 2) are located in recesses formed between the elements 54 and 56 and are yieldingly engaged by springs 58 mounted in said recesses. The clutch member 54 (Figs. 2, 22 and 23) acts through the balls to drive the clutch member 56, and hence the shaft 40, in one direction, but is unable to drive said clutch member and shaft in the opposite direction. It will be observed that the disc 46 (Figs. 1 and 23) acts to reciprocate the rack 47, and hence to cause the clutch member 54 to be driven first in one direction and then in the opposite direction. The result is that the feeder 3, (Figs. 1, 4, 6, 7, 11, 12 and 23) acts to advance the web through one period and then stands idle during a period of equal duration. The feeder 3 is smoothly accelerated from a condition of rest and smoothly retarded after it has attained its maximum velocity.

It would be objectionable, however, to have an intermittent feeder like the feeder 3 act to draw the web directly from the reel 2 (Figs. 4 and 6) particularly when anti-friction web material is used. The roller 31 (Fig. 4) already referred to, forms a portion of a feeding device for maintaining a loop of web available between the reel 2 and the feeder 3. The roller 31 is mounted at the end of arms 60 which are carried by a shaft 61. A connecting rod 62 is eccentrically pivoted to the shaft 63 and fits at the upper end thereof into a socket formed in one arm 64 of a bell-crank lever 65 (Fig. 5). The other arm 66 of the bell-crank lever extends upward and constitutes a clutch shifting fork. The arms of this clutch shifting fork embrace a hub 67 which is slidingly keyed to a shaft 68 by means of a key 69 fast on the shaft and a groove 70 formed in the hub. The hub is also provided with a circumferential groove 71 in which pins 72 (Figs. 4 and 5), carried by the arms of the fork 66, are received. The hub 67 is normally pressed toward the left as viewed in Fig. 5 by a coil spring 73, which encircles the shaft 68 and which bears at one end against a collar 74, fast on the shaft 68, and at the opposite end against the hub 67. The hub 67 carries a clutch member 75 which is normally held by the spring 73 in engagement with a mating clutch member 76. The clutch member 76 is carried by a hub 77, rotatably mounted on the shaft 68, which hub has fast upon it a sprocket 78. The sprocket 78 is driven by a chain 79, and the sprocket 78 normally drives the shaft 68 through the clutch elements described. The shaft 68 drives a chain 81, through a sprocket 80, and the chain 81 in turn drives a sprocket 82 fast on the shaft 83 of the feed roller 28 (Figs. 4 and 6). The described feeding mechanism would be effective, if continuously operated, to gain a little on the feeder 3. When this gain is sufficient, however, to permit the roller 31 (Fig. 4), to drop below a pre-determined point, the weight of the arms 60 causes the connecting rod 62 (Figs. 4 and 5) to rise and to swing the bell-crank 65 clock-wise (as viewed in Fig. 5), so that the clutch member 75 is disengaged from the member 76. The feeder 3 then causes a portion of the slack web to be consumed and the clutch members to be reengaged.

As has been mentioned, the leading end of the tube is advanced by the feeder 3 through a cutting mechanism 7, (Figs. 1, 7 and 12). This cutting mechanism 7 comprises a pair of opposed blades 90 and 91 which are fixed, respectively, upon reciprocable slides 92 (Figs. 1 and 7), and 93 both mounted in a fixed guide 94. The slide 93 is connected through links 93a (Fig. 1) each to one of two cranks 95; and these cranks are, in turn, connected through a rock shaft 96 with a further crank 97 which has a slot 98 provided in the lower end thereof. The slide 92, (Figs. 1 and 7) is connected through links 99 (Fig. 1) with cranks 100; and these cranks are, in turn, connected through a rock shaft 101 with a further crank 102, having at the upper end thereof a pin 103, which plays in the slot 98 of the crank 97. A further crank 104 is secured to the rock shaft 101, and carries a cam follower 105 for engaging a cam 106 fast on a constantly rotating shaft 107. A spring 108 connected to the crank 109 holds the follower 105 in engagement with the cam 106. The arrangement is such that the cam produces oscillation of the arm 104, and hence, through the described connections, causes the blades 90 (Figs. 1, 7 and 12) and 91 to travel in opposite directions simultaneously, so that they travel past one another to cut the leading blank from the web tube at the appropriate time in the cycle of operations—that is to say, promptly after the tube has come to rest. The cutting edge of the upper blade is desirably slightly inclined and that of the lower blade is desirably horizontal, so that the tube is cut progressively from side to side. The cam 106 (Fig. 1) is so formed that the blades 90 and 91 are caused to be separated widely at the beginning of a feeding stroke. After the leading end of the tube has been advanced through the opening between the blades, the blades are caused gradually to approach one another but not near enough to affect the feeding of the tube. Just after the tube has come to rest, however, the follower 105 rides over a hump 109 on the cam to cut the tube, and the blades are then again separated.

While the tube from which the blade has just been severed is at rest, the tucker blades 9 (Figs. 7, 8, 9 and 10) are swung inward into the slot 44 (Figs. 1, 8 and 10) to tuck in the leading corners of the tube. Each tucker blade 9 is fixed upon a crank 110 (Figs. 8 and 9) which crank, in turn, is fixed upon a rock shaft 111. Each shaft 111 is carried by an arm 112 (Figs. 1, 7 and 9) having a slot 113 therein. Each arm 112 is held to a stationary member 114 of the frame by a bolt 115 and a clamping nut 116. When the nut is loosened the arm 112 may be adjusted longitudinally and angularly, the arrangement being such that the axis of a shaft 111 may be set at any desired position along the forward edge of the plate 8 to cause it to lie at the intersection of such edges with a side edge of the tube. The operating edge of a tucking blade is thus caused to swing about a point located in an edge of the tube. The tucker blades are mounted so that they can be readily removed and replaced by other blades of suitable length, when the arms 112 are readjusted to adapt the mechanism to make bags of a different size. The forming plate 8 may also be replaced for the same purpose, but the substituted forming plate will terminate substantially at the same point at which the leading end of the forming plate 8 is shown in Figs. 8 and 9.

The mechanism for operating the tucking blades 9 comprises a cam 117 (Fig. 1), fast on the shaft 107, which cam acts upon a cam follower 118, carried by a lever 119. The follower 118 is urged into engagement with the cam 117 by a spring 120 which acts on the lever 119. The lever 119 is connected through a link 121 to a crank 122 fast on a rock shaft 123, and imparts rocking motion to said shaft. The shaft 123 carries two bevel gears 124, each of which drives a bevel pinion 125, mounted on a vertical shaft 126. Each shaft 126 is journalled in a fixed frame member 128, and is connected through a universal joint 129 with a tubular shaft member 130 within which is telescoped a shaft member 131. The tubular member 130 is slidable longitudinally with reference to the member 131, but is keyed to said member 131, so that the two members 130 and 131 rotate in unison. The shaft member 131 is connected through a universal joint 132 with the tucker blade rock shaft 111 (Figs. 1, 8 and 9). The train of mechanism described is provided in duplicate from the shaft 123 (Fig. 1); and the trains act simultaneously, intermittently to operate and retract the associated tucker blades 9.

When the tucker arms have been swung in and then out again to clear the path of web feeding, the feeder 3 again acts to advance the tube. It will be observed that the tucking operation produces an upper triangular tab 133 (Figs. 9, 14, 15 and 21) at the leading end of the tube, and a lower triangular tab 134 at said leading end. These tabs, immediately after passing the cutting blades 90 (Figs. 1, 7 and 12) and 91, pass between rollers 135 and 11 (Figs. 1, 11 and 12). These rollers are slightly spaced from each other and do not grip the blank between them to feed it, the tube being advanced by the feed rollers 37 and 38. The roller 11 is provided with a radial passage 136 (Figs. 1 and 11) which communicates, through the hollow shaft 137 to which said roller is attached, with a suitable source of suction, the suction being applied at the time when the passage 136 comes opposite the roller 135 and for a considerable period thereafter. The suction holds the upper tab 133 yieldingly to the periphery of the roller 11 (Fig. 11), but is ineffective to act upon the lower tab 134. The upper tab is accordingly separated from the lower tab, and the lower tab is caused to advance by itself between rollers 138 and 139 (Figs. 1, 11, 12 and 23), which are also slightly spaced from each other. The continued advance of the web causes the upper tab to travel between the rollers 138 and 139 and to be folded back flat substantially against the upper face of the tube. The rollers 138 and 139 do not, however, grip the web between them.

Before the leading blank is severed, the web is under the joint control of the feed rollers 37 and 38 (Figs. 1, 4, 11, 12 and 22), and travels between rollers 11 and 135, (Figs. 1, 11 and 12) and rollers 138 and 139. It will be remembered that the feed rollers 37 and 38 are driven intermittently, and that when driven they are advanced gradually from a condition of rest to the maximum speed and then gradually retarded to a condition of rest, the effect of the rack 47 and the pinion 48 (Figs. 1 and 23), being to cause the speed of the rollers 37 and 38 to be represented substantially by a sinusoidal curve. The character of the speed curve is not affected by the angular extent of rotation of the rollers 37 and 38, but by the kind of motion imparted through the disc 46 and the rack 47. The extent of such motion produced by a single feeding stroke may be adjusted according to the length of blanks desired by adjusting toward and from the center of the disc 46, the connection between the rack 47 and said disc. A headed bolt 46$^a$ has its head received in an undercut radial slot 46$^b$ formed in the disc. A shouldered bearing sleeve 46$^c$ (Fig. 1) is mounted upon the bolt. The end of the rack 47 (Figs. 1 and 23), surrounds and has bearing upon the sleeve 46$^c$. An end bearing disc 46$^d$ is held fast against an end of the sleeve 46$^c$ by a nut 46$^e$ (Fig. 1). The nut 46$^e$ clamps the bolt head and the sleeve shoulder firmly to the disc 46. While the web is under the control of the feed rollers 37 and 38 and is being operated upon by rollers 11 and 135 and rollers 138 and 139 (Figs. 1, 11 and 12), it is desirable that all of these sets of rollers operate at like variable peripheral speeds, so that their operations will be in phase and harmonious. It will be observed that the cutter operates just at the end of the feeding cycle of the rollers 37 and 38, at the instant when the web is at rest. Once the leading blank has been severed, the advance of the severed blank may be resumed even though the rollers 37 and 38 are stationary. It is desirable that the blank be advanced during the idle period of the rollers 37 and 38 in order to provide a proper spacing between the blanks. Before describing the mechanism for continuing the advancement of the blank it is desired to complete the description of the operation of the rollers 11, 135, 138, 139. It should be borne in mind that the suction passage 136 (Figs. 1 and 11), must always engage the leading end of the upper tab 133 of the web, and this at a time when the rollers 37 and 38 are advancing the web. This imposes two requirements: one, that the speed of the roller 11 (Figs. 1, 11 and 12) shall vary so that the roller advances in harmony with the rollers 37 and 38; and, two, that the suction passage occupy a definite angular position at the instant when the feeding of the web is resumed after a cutting operation. Having in mind that the rollers 37 and 38 have a given angular or linear travel for one length of blank and a different extent of travel for another length of blank, it follows that the roller 11, in order to operate in harmony, should have correspondingly varying extents of travel. This introduces a difficulty in the matter of timing of the suction passage 136 with reference to the other operating instrumentalities.

It is also to be borne in mind, however, that the rollers 11, 135 and 138, 139 do not cooperatively grip the web or the blank severed from the web. Provision is accordingly made for driving these sets of rollers forward in harmony with the rollers 37 and 38 during advance of the web and for driving them backward while the rollers 37 and 38 are idle, to exactly the same extent that they were advanced during the feeding operation. This restores the suction passage 136 to its original position regardless of the extent of the intervening advancing and retracting steps.

The mechanism for effecting this mode of operation is illustrated in Figs. 22 and 23. The clutch member 54 which is loose on the shaft 40 is driven first in one direction to advance the rollers 37 and 38, which are connected with each other by gears 37ª and 38ª, secured to shafts 39 and 40, respectively; and then in the opposite direction to an equal extent, while leaving the rollers 37 and 38 idle. The clutch member 54 has fast upon it a sprocket 54ª which acts through a chain 54ᵇ to drive a sprocket 135ª, which is loose upon the shaft 135ᵈ of the roller 135. The sprocket 135ª has fast upon it a gear 135ᵇ which drives a gear 11ᵇ, fast on the hollow shaft 137, to thus reciprocate the suction roller 11 with the clutch member 54. A sprocket 40ª, secured to the shaft 40, drives a chain 40ᵇ, cooperating with a sprocket 135ᵉ, secured to the shaft 135ᵈ, to rotate the roller 135 with the roller 11, and also only in one direction. A gear 135ᶠ, also secured to the shaft 135ᵈ, acts through an intermediate gear 135ᶜ to drive a gear 139ª, which is fast upon the shaft of roller 139. The gear 139ª in turn drives a gear 138ª, which is fast upon the shaft of the roller 138.

Prior to the severing of the blank, the leading end of the tube is advanced between a roller 150 (Figs. 1, 11 and 12), and an opposed feeding segment 151 both of which are constantly driven from the main shaft 151ª (Figs. 1 and 23). The segment 151 (Fig. 1) is fast upon a shaft 152 which is journalled in a rocking frame 153. The frame 153 is fulcrumed upon a shaft 154 and is urged counter-clock-wise to carry the segment toward the roller 150, by a spring 155ª, which is interposed between the frame 153 and a fixed abutment 155. A connecting rod 156 connects the frame with a crank 157, fast on a rock shaft 158. A further crank 159, which is also fast on the rock shaft 158, carries a roller 160, which runs in engagement with a cam 161 carried by a shaft 162. This shaft 162 makes one revolution to each two revolutions of the shaft 152, by which the segment 151 is carried. During one complete revolution of the shaft 152 the segment is held completely out of engagement with the roller 150. During the succeeding revolution, the cam 161 permits approach of the segment 151 toward the roller 150 at a time when the cut-out portion of the segment is opposite the roller, so that these elements may cooperate to advance the severed blank during that portion of the revolution when the active surface of the segment is opposite the roller 150. The parts are so timed that the segment is caused to come into play substantially simultaneously with the severance of a blank. The lifting of the segment 151 by the cam 161 enables the leading end of the tube to be advanced freely beyond the bight of the feeder 150, 151 a distance greater than the peripheral extent of the segment cutout. The segment takes hold of the severed blank uniformly and feeds it evenly with no tendency to produce skewing. Two feeders 163, 164 and 165, 166 (Figs. 1 and 7) are next provided, consisting respectively of a broad lower roller 164 and a pair of upper, laterally-adjustable rollers 163; and of a broad lower roller 166 and a pair of upper, laterally-adjustable rollers 165. These rollers are constantly operated at the same peripheral speed as the roller 150. If the blanks being cut are long enough to reach from the cutter into the bight of the rollers 163, 164, then the rollers 163 are moved laterally of the machine to positions outside the lateral bounds of the path of blank travel, so that they are taken entirely out of action. The rollers 165 are laterally adjustable for a like purpose. If the blank is not long enough to reach the bight of the rollers 165, 166, the rollers 163, 164 are used. In such case the roller 150, in cooperation with the segment 151, acts upon the blank to feed the leading end thereof to the rollers 163, 164, and these in turn feed the blank to the rollers 165, 166. When the longer blanks are being produced and the rollers 163, 164 are out of action, the roller 150 and the segment 151 act upon the blank to feed the leading end thereof to the rollers 165, 166. The driving of the uniformly driven rollers and the segment just described is effected from the main shaft 151ª through a gear 167 fast on the shaft, and gears 166ª, 165ª, 168, 164ª, 163ª, 169, 150ª and 152ª (Fig. 23). The gears 166ª, 165ª, 164ª, 163ª and 150ª are fast respectively upon the shafts of rollers 166, 165, 164, 163 and 150, and the gear 152ª is fast upon the shaft 152 of segment 151 (Fig. 1).

The geared connections are such that the cylinders 15 and 16 travel at the same peripheral speeds as the rollers 150, 163, 164, 165 and 166 and the segment 151.

The blank is advanced by the cylinders as shown in Fig. 13; and there a tucker bar 171, carried by the cylinder 15, acts to tuck the lower tab 134 into a gripper carried by the cylinder 16, which comprises fixed and movable jaw members 172 and 173. The tucker bar 171 is carried yieldingly by a slide 174, which slide is movable in a radial slot 175 formed in an angularly adjustable segment 176 of the cylinder 15. A coil spring 176ª connected to the tucker bar 171 and to a pin 177 fixed on the cylinder 15 maintains the tucker bar normally in a substantially radially-extending position in face to face contact with the slide upon which it is mounted. The slide 174 carries at each end a pin 178 (Fig. 1), which is embraced by a slotted arm 179. Each arm 179 is mounted upon a stub shaft 180 on the end of the cylinder 15. Each arm 179 also has upon it a cam follower 182 that runs in engagement with a stationary cam 183 suitably secured to the machine frame. The follower 182 is held in contact with the cam by means of a spring 184, which is connected to the arm 179 and to a pin 185 fast on the cylinder 15.

Gum segments 186 and 187 (Fig. 13) are provided upon the cylinder 15, and these segments, as the cylinder revolves, run in contact with a gum roller 188 (Fig. 1), mounted in a gum pot 189. The gum segments apply four spots of gum 190, 191, 192, and 193 (Figs. 14 and 15) to the lower and upper tabs of the blank; and they are adjustable about the cylinders 15 in accordance with differences in the size of the bags. The cams 183 (Fig 1) cause the tucker bar 171 (Figs. 1 and 13) to be reciprocated radially, so that it escapes engagement with the gum roller 188 (Fig. 1), but is projected beyond the peripheral path of the gum segments 186, 187 (Fig. 13) when performing its tucking operations.

After the lower tab has been tucked and gripped, it is advanced by the cylinder 16 (Figs. 1, 7, 13 and 17) against two belts 195 (Figs. 1, 7, 17, 20 and 21), which form elements of the conveyor 17 (Figs. 1 and 17). The belts 195 run upon pulleys 196 (Figs. 1, 7 and 17), which carry between them a pressing segment 196ª (Figs. 7 and 17), that stands out flush with the surface of the belts 195 so that the lower tab is pressed firmly down against the gum spots 190 and 191 (Figs. 14 and 15). The segment 196ª is of such extent and is so timed that it presses down the folded-over lower tab 134, but escapes engagement with the gum spots 192 and 193 on the upper tab.

Simultaneously with the taking over of the control of the blank by the belts 195 and the cylinder 16, the gripper jaw 173 (Figs. 13, 16 and 17) is swung to an open position to release the blank. The movable gripper jaw is carried by rock shaft 197, which shaft carries an arm 198 that rides upon a stationary cam 199. The arm 198 is held toward the cam by a spring 200. Stripper members 201 (Figs. 1 and 17) are mounted to ride in grooves 202 (Figs. 7 and 17) formed in the periphery of the cylinder 16. These strippers deflect the blank away from the cylinder 16 and act as guides to cause the blank to follow the path of movement of the belts 195, (Figs. 1, 7, 17, 20 and 21). The blank is thus advanced into the bight formed between the belts 195 and a wide belt 203 which runs upon a cylinder 204 (Figs. 1 and 17), fast on a shaft 205, and upon rollers 203ª, 203ᵇ and 203ᶜ and 203ᵈ (Fig. 1). Each blank thus delivered to the conveyors 17 and 18 (Fig. 1) is supported through its width by the wide belt 203 and is gripped marginally by the narrow belts 195 (Figs. 1, 7, 17, 20 and 21). The pulleys 196 and the cylinder 204 (Figs. 1 and 17) are driven from gear 16ª through gears 196ª and 204ª (Fig. 23).

The wide belt 203 (Figs. 1, 7, 17 and 20) travels upon a roller table consisting of closely spaced, narrow rollers 206 (Figs. 1, 7 and 18), which are arranged upon an arc of a circle, so that the blank is caused to travel in a curved path and to be held in a curved condition. The curvature of the roller table enables the narrow belts 195 to press the blank positively against the wide belt 203 (Figs. 1, 17 and 20), and to grip it securely without the necessity for providing any hold-down devices between the pulleys 196 and pulleys 207 at the delivery end of the belts 195 (Fig. 1). The convexity of the conveyor also causes the gummed portion of the upper tab 133 to stand out tangent to the conveyor (Fig. 18), and away from the body of the blank, so that the insertion is facilitated of the folding device 20 (Figs. 1 and 7) beneath the upper tab from behind.

After the blank is advanced along the conveyor 18 for a distance, the tucker blade 19 (Figs. 1, 7, 18, 19 and 20) is swung down to lie momentarily in close proximity to the traveling blank (Fig. 19). This tucker blade 19 is secured to a rock shaft 208 (Figs. 1, 18, 19 and 20) which shaft is connected through a crank 209 to a thrust rod 210 (Figs. 1, 7, 18, 19 and 20). The thrust rod 210 is forked (Fig. 1) at the end thereof remote from the crank 209 and the forked end embraces the shaft 196ᵇ by which the pulleys 196 are carried. The thrust rod 210 also carries a cam follower 211 (Figs. 1 and 7) which rides upon a cam 212 fast upon the shaft 196ᵇ. A spring 213, connected to the rod 210 and to a fixed frame member, holds the follower 211 in engagement with the cam 212. The cam and spring are effective to reciprocate the arm 210 and to cause the tucker blade 19 to be projected into operative position and withdrawn therefrom in desired time relation to the other operating parts.

The folding device 20 (Figs. 1 and 7) is operated along the path of the conveyor 18 (Fig. 1) to cooperate with the tucker blade 19 in folding the upper tab; and to cooperate with said conveyor in pressing the folded tab down firmly to smooth it out and to assure a good adhesive union of the tab. The folding device comprises a folding plate 214 which is fixed upon an arm 215 (Figs. 1, 7, 18, 19 and 20), secured to a rock shaft 215ª. The rock shaft is pivoted upon two oscillating arms 216 rigid on a rock shaft 216ª. A spring 217 (Figs. 1, 7 and 18) is connected between one of the arms 216 and an arm 215ᵇ, (Figs. 7, 18, 19 and 20) at one side of the shaft 215ª and pulls downward upon the arm 215ᵇ. The arm 215ᵇ carries a roller 218 at the outer end thereof which rides upon a cam plate 219 (Figs. 1, 7, 18, 19 and 20), located alongside the conveyor 18. One of the arms 216 is pivotally connected through a link 220 with a further arm 221 (Fig. 1) which is pivotally mounted and arranged to operate in parallel relation with the arm 216. The link 220 carries a roller 222 which runs in engagement with a cam 223 (Fig. 1) fast on the shaft 45 (Figs. 1 and 23). A spring 224 (Fig. 1), connected to the arm 221 and to a fixed frame member, holds the roller 222 in engagement with the cam 223.

The operations of the tucker blade 19 and of the folding and pressing plate 214 are best illustrated in Figs. 18 to 21. The tucker blade 19 starts from the position illustrated in Fig. 18, and is moved down to the position illustrated in Fig. 19, being so timed with the advancement of the blank that it is in position to assist in folding the upper tab. In the early period of advancement of the blank, the arms 216 lag behind so as to permit the upper tab to reach a position definitely in advance of the plate 214. The arms 216 then sweep forward at a speed considerably greater than that of the blank. When the leading edge of the plate 214 is a short distance behind the trailing end of the upper tab, the roller 218 drops into a depression 225 of the cam plate 219 (Figs. 1, 7, 18, 19 and 20) causing the plate 214 to descend into a position almost in contact with the blank and with its forward end substantially tangent to the conveyor 18 (Fig. 1). The arms 216 (Figs. 1, 7, 18, 19 and 20) continue their rapid advance, inserting the plate 214 beneath the upper tab. During this movement, the roller 218 is gradually raised as it approaches a hump 226 (Figs. 18 and 19) of the cam plate 219, so that the plate 214 is caused to lift the rear end of the upper tab and fold it around the edge of the tucker blade 19. The blade 19, however, desirably withdraws after the tab is partly folded and before the gummed face of the tab has reached contact with it. The roller 218 then descends into a notch 227 (Figs. 18, 19 and 20) of the cam plate 219, which causes the plate 214 to rock forward and downward as it advances, to complete the folding of the upper tab. At this time the plate 214 travels at about the same speed of the bag. This notch 227 is so deep that the full force of the spring 217 (Figs. 1, 7 and 18) is borne by the blank, so that a sharply defined crease is produced. The arm 216 is then swung rapidly forward again to draw the plate 214 over the folded tab and iron it. The roller 218 reaches a further notch 228 (Figs. 18 and 20) of the cam plate 219 before the forward edge of the folded-over upper tab has come opposite said notch, and the roller is again permitted to descend to apply the full force of the spring 217, through the plate 214, to the blank. The plate 214 is now caused to remain stationary in this position while the upper tab of the blank is advanced beyond the notch 228. The blank is then fed out by the conveyors 18 and 17, and the arms 216 are returned to restore the plate 214 to the original position illustrated in Fig. 1.

In order to accommodate bag blanks of different lengths, provision is made for adjusting the timing of the cylinders 15 and 16, the pulleys 196, the tucking blade 19, and the folding device 20 relative to the other operating parts. This end is desirably accomplished by making the gear 167 (Fig. 23) angularly adjustable upon the main shaft 151$^a$, and the cams 212 and 223 (Fig. 1) angularly adjustable upon the shafts by which they are driven. Such adjustment may be effected in each instance by securing the adjustable member to its shaft through a set screw. When the length of the bag is sufficient to reach from the bight of the rollers 163 and 164 (Figs. 1 and 7) to the bight of the cylinders 15 and 16, the rollers 165 (Fig. 1) may be moved outwardly on their shaft toward the sides of the machine, so as not to engage the bag.

Figure 25:
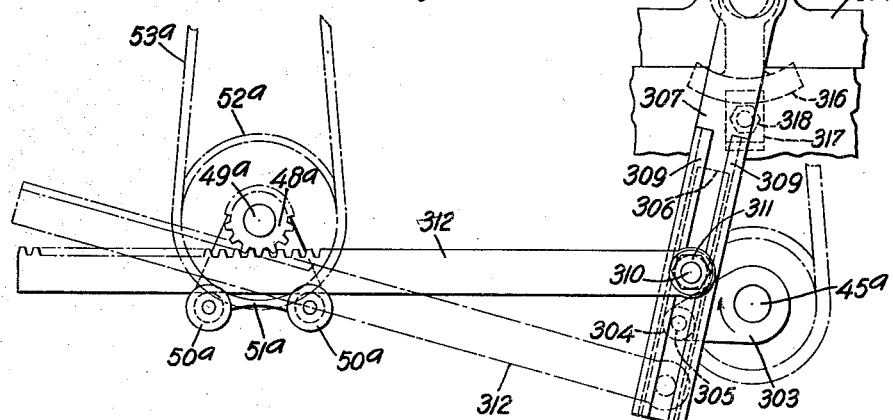
Fig. 25 is a fragmentary detail view illustrating a feature which is desirably employed in order to take care of a condition which arises where a printed web is used.
Figure 26:
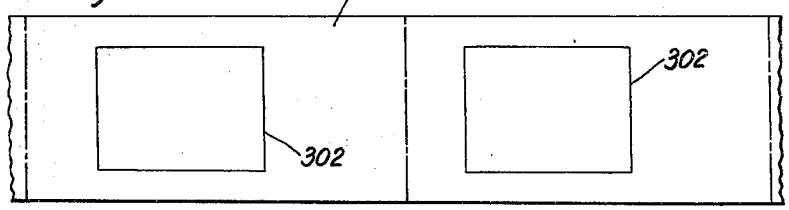
Fig. 26 is a fragmentary plan view of a web section with several successive printed areas indicated thereon.

The construction of Fig. 25 illustrates a feature which is desirably embodied in the machine for dealing with printed webs 300, as illustrated in Fig. 26, for making them into bags 301, as illustrated in Fig. 24. The only difference between the web and bag of Figs. 26 and 24, respectively, and the web and bag of the other figures, is that the web is here supplied to the machine with printing at regular intervals thereon, as indicated by the areas 302.

The web is printed and reeled on a separate printing machine, and the reels are thereafter placed in the bag making machine. Because of the hygroscopic character of the material, the printed areas, which are intended to be spaced at exact distances along the web, will be so spaced when the web is fed to the bag making machine only if the conditions of humidity were the same at the time when the web was printed as they are at the time when the web is used in the bag making machine. If, however, a web of hygroscopic material such as "Cellophane" is employed, when the web comes to the bag making machine printed areas which are intended to be spaced at predetermined intervals along the web may be uniformly spaced a little farther apart, or uniformly spaced at slightly less intervals, if the weather conditions are different. Furthermore, the weather conditions may vary considerably in the course of a day; and if the bag making machine is allowed to operate continuously at a fixed setting for the assumed or the initial spacing of the printing, the changed spacing will cause the printed areas to creep progressively nearer and nearer to the tops or to the bottoms of the bags; and if uncorrected, will eventually cause the printed areas to be cut in two or divided between successive bags.

The construction of Fig. 25 is designed to provide an adjustment under the control of the operator whereby he may effect a correction when he sees that the printed areas are progressing in one or other direction from the desired location on the bags. This adjusting means is designed to increase or diminish the length of the feeding stroke of the feeding couple 37 and 38 and of the other parts which operate in unison with said feeding couple, while enabling the operation of the machine to be continued without interruption.

In Fig. 25 the shaft 45$^a$ is provided with a crank 303 which carries a roller 304 upon a crank pin 305. The roller 304 runs in a slot 306 (indicated in dash lines in Fig. 25), the slot being provided in one side of a rocker arm 307. The rocker arm 307 is journalled upon a crank pin 308, and is oscillated relatively thereto. At the side of the rocker arm 307 which is visible in Fig. 25, provision is made of guide ribs 309 which form a T slot. The pivot bolt 310 has its head received in the T slot and is adapted to be clamped in any desired adjusted position along the slot by means of a nut 311. The rack bar 312 is journalled upon the shank of the pivot bolt and coacts with a pinion 48$^a$ which corresponds to the pinion 48 of Fig. 1. The parts marked 49$^a$, 50$^a$, 51$^a$, 52$^a$ and 53$^a$ correspond respectively to the parts 49, 50, 51, 52, and 53 of Fig. 1. Adjustment of the pivot bolt 310 toward and from the axis of the rocker arm 307 is effective to shorten and lengthen, respectively, the feeding stroke imparted through the rack bar 312 to the pinion 48$^a$. This adjustment, however, is ordinarily permanently set up and maintained for any given size of bag and it is desirable to provide other adjusting means for taking care of the minute but cumulative errors which may be caused by a slightly inaccurate setting, or which may be introduced by the hygroscopic character of the work web. It is for this reason that the rocker arm 307 is mounted upon an eccentric pin 308.

The pin 308 is carried eccentrically upon a shaft 313 which is journalled in a frame member 314. An operating lever 315, fast on the shaft 313, may be rocked in either direction from the normal position illustrated in Fig. 25, at the will of the operator. When the lever 315 is rocked clockwise, as is viewed in Fig. 25, the rocker arm 307 is moved downward and the stroke of the rack bar 312 is thereby increased. When the lever arm 315 is moved counterclockwise, as viewed in Fig. 25, the rocker arm 307 is moved upward and the stroke of the rack bar 312 is thereby reduced. Changing the stroke of the rack bar produces a corresponding change in the length of the bags produced by the machine.

When the accumulated error has been sufficiently compensated, the arm 315 may be set to the position which in the operator's judgment is most likely to cause no further error to occur and may be clamped in that position. To this end, the lever 315 is provided with a segment 316 which is adapted to be engaged and clamped by a clamping plate 317 upon tightening of a bolt 318.

I have described what I believe to be the best embodiment of my invention. I do not wish, however, to be confined to the embodiments shown, but what I desire to cover by Letters Patent is set forth in the appended claims.

I claim:

1. In a bag making machine, in combination, a web supply reel, means for forming the web into a tube, a cutter for severing bag lengths from the tube while the tube is idle, means for intermittently feeding the tube to the cutter, comprising intermittently rotating feed rollers, and power means, including other intermittently rotating feed rollers controlled by the web for drawing the web from the supply reel.

2. In a bag making machine, in combination, a web supply reel, means for forming the web into a tube, a cutter for severing bag lengths from the tube while the tube is idle, means for intermittently feeding the web to the cutter, comprising intermittently rotating feed rollers, and power means, including other intermittently rotating feed rollers interposed between the supply reel and the intermittent feeding means and controlled by the web for drawing the web from the supply reel smoothly, and a gumming roller acting on the web as it is advanced by the power feeding means.

3. In a bag making machine, in combination, a web supply reel, means for forming the web into a tube, a cutter for severing bag lengths from the tube while the tube is idle, means for intermittently feeding the tube to the cutter, comprising an intermittently rotating set of feed rollers, operating mechanism for causing said set of feed rollers to be accelerated and retarded smoothly during each feeding operation, and caused to dwell in the intermissions, means to actuate said cutter during said intermissions, power means including another set of feed rollers interposed between said feeding means and the supply reel for drawing the web therefrom smoothly, and means to effect intermittent actuation of said second-named set of feed rollers comprising a clutch and a clutch shifting means including a weight controlled by the web.

4. In a bag making machine, in combination, means for supplying a web of bag material, means for forming the web into a tube, means for tucking in the sides of the leading end of the tube, said last-named means including arms mounted pivotally, and a bifurcated stationary former into which said arms tuck said sides of the tube end to form a quadruplex V-shaped fold, a knife for severing bag lengths from the tube periodically, and means for feeding the web intermittently past the tube forming means and to the knife, comprising tube engaging rollers and roller operating mechanism for causing the rollers to be accelerated and retarded smoothly.

5. In a bag making machine, in combination, means for supplying a web of bag material and forming a tube thereof, means for tucking in the sides of the leading end of the tube, said last-named means including arms mounted pivotally, and a bifurcated stationary former into which said arms tuck said sides of the tube end to form a quadruplex V-shaped fold, a knife for severing bag lengths periodically from the tube, and means for feeding the tube intermittently to the knife, comprising tube engaging rollers and operating mechanism for smoothly accelerating and retarding the rollers, said operating mechanism including a continuously rotating member, a connecting rod operated thereby, and means for applying the linear speed variations of the connecting rod to the peripheries of the rollers.

6. In a bag making machine, in combination, means for supplying a web of bag material and forming a tube thereof, means for tucking in the sides of the leading end of the tube, said last-named means including arms mounted pivotally, and a bifurcated stationary former into which said arms tuck said sides of the tube end to form a quadruplex V-shaped fold, a knife for severing bag lengths periodically from the tube, and means for feeding the tube intermittently to the knife, comprising tube engaging rollers and operating mechanism for smoothly accelerating and retarding the rollers, said operating mechanism including a continuously rotating member, a rack bar reciprocated thereby, being engaged directly therewith, a pinion driven by the rack bar, and means for applying the speed variations of the pinion in one direction of movement thereof to the rollers, including gearing and a one-way clutch.

7. In a bag making machine, in combination, means for supplying a web of bag material and forming a tube thereof, means for tucking in the sides of the leading end of the tube, said last-named means including arms mounted pivotally, and a bifurcated stationary former into which said arms tuck said sides of the tube end to form a quadruplex V-shaped fold, a knife for severing bag lengths periodically from the tube, and means for feeding the tube intermittently to the knife, comprising tube engaging rollers and operating mechanism for smoothly accelerating and retarding the rollers, said operating mechanism including a continuously rotating member, a rack bar reciprocated thereby, being engaged directly therewith, a pinion driven by the rack bar, means for applying the speed variations of the pinion in one direction of movement thereof to the rollers, including gearing and a one-way clutch, and means for adjusting the rack bar toward and from the center of the continuously rotating member to change the extent of a feeding step while maintaining the character of the feeding unchanged.

8. In a bag making machine, in combination, means for feeding a tube of bag material intermittently, a cutter for severing bag lengths periodically from the tube, means for tucking in the corners of the leading end of the tube in advance of the cutter while the tube is idle to provide upper and lower tabs, means comprising a suction roller beyond the cutter for folding back the upper tab at the leading end of the tube, and means for operating said suction roller in harmony with the intermittent feeder when the tube is being fed.

9. In a bag making machine, in combination, means for feeding a tube of bag material intermittently, a cutter for severing bag lengths periodically from the tube, means for tucking in the corners of the leading end of the tube in advance of the cutter while the tube is idle to provide upper and lower tabs, means comprising a suction roller beyond the cutter for folding back the upper tab at the leading end of the tube, and means for operating said suction roller in harmony with the intermittent feeder when the tube is being fed and for operating said roller to an equal extent in the reverse direction when the intermittent tube feeding means is idle.

10. In a bag making machine, in combination, means for feeding a tube of bag material intermittently, a cutter for severing bag lengths periodically from the tube, means for tucking in the corners of the leading end of the tube in advance of the cutter while the tube is idle to provide upper and lower tabs, means comprising a suction roller beyond the cutter for folding back the upper tab at the leading end of the tube, and a common operating means for the intermittent feeding means and said suction roller connected to drive the feeding means and the suction roller in harmony during one part of an operating cycle, and to return the suction roller to the same extent while permitting the feeding means to remain idle in another portion of the cycle.

11. In a bag making machine, in combination, means for feeding a tube of bag material intermittently, a cutter for severing bag lengths periodically from the tube, means for tucking in the corners of the leading end of the tube in advance of the cutter while the tube is idle to provide upper and lower tabs, means comprising a suction roller beyond the cutter for folding back the upper tab at the leading end of the tube, a common operating means for the intermittent feeding means and said suction roller connected to drive the feeding means and the suction roller in harmony during one part of an operating cycle and to return the suction roller to the same extent while permitting the feeding means to remain idle in another portion of the cycle, and means for adjusting the operating means to alter the extent of movement of the feeding means and the roller while maintaining the relation of their operations unchanged.

12. In a bag making machine, in combination, means for feeding a tube of bag material intermittently, a cutter for severing bag lengths periodically from the tube, means for tucking in the corners of the leading end of the tube in advance of the cutter while the tube is idle to provide upper and lower tabs, tab turning means comprising a suction roller for lifting the upper tab away from the lower tab, a folding roller for turning back the lifted tab, and cooperating tube supporting rollers spaced from the suction roller and the folding roller in non-gripping relation thereto, and means for operating said rollers in harmony with the intermittent tube feeding means when the tube is being fed.

13. In a bag making machine, in combination, means for feeding a tube of bag material intermittently, a cutter for severing bag lengths periodically from the tube, means for tucking in the corners of the leading end of the tube in advance of the cutter while the tube is idle to provide upper and lower tabs, tab turning means comprising a suction roller for lifting the upper tab away from the lower tab, a folding roller for turning back the lifted tab, and cooperating tube supporting rollers spaced from the suction roller and the folding roller in non-gripping relation thereto, and means for operating said rollers in harmony with the intermittent tube feeding means when the tube is being fed, and for operating said rollers to an equal extent in the reverse direction when the intermittent tube feeding means is idle.

14. In a bag making machine, in combination, means for feeding a tube of bag material intermittently, a cutter for severing bag lengths periodically from the tube, means for tucking in the corners of the leading end of the tube in advance of the cutter while the tube is idle to provide upper and lower tabs, means comprising a suction roller beyond the cutter for folding back the upper tab at the leading end of the tube, means for operating said suction roller in harmony with the intermittent feeder when the tube is being fed, and for operating said roller to an equal extent in the reverse direction when the intermittent tube feeding means is idle, and means for taking control of the severed blank and positively advancing it while said suction roller is being operated backward.

15. In a bag making machine, in combination, means for supplying a web of bag material and forming a tube thereof, a cutter operating periodically to sever a bag length from the leading end of the web, intermittent tube feeding means for feeding the tube past the cutter, a forming plate to support the walls of the tube interiorly, divergent extensions of said forming plate adapted to support re-entrant folds at the corners of the leading end of the tube, means located in advance of the cutter for tucking in the corners of the leading end of the severed tube, between said divergent extensions and means for operating said tucking means while the tube feeding means is idle.

16. In a bag making machine, in combination, means for supplying a web of bag material and forming a tube thereof, a cutter operating periodically to sever a bag length from the leading end of the web, intermittent tube feeding means for feeding the tube past the cutter, a forming plate to support the walls of the tube interiorly, divergent extensions of said forming plate adapted to support re-entrant folds at the corners of the leading end of the tube, means located in advance of the cutter for tucking in the corners of the leading end of the severed tube, between said divergent extensions, means for operating said tucking means while the tube feeding means is idle, and means for advancing the severed blank while the tucking means is being operated.

17. In a bag making machine, in combination, means for feeding a tube of bag material intermittently, a cutter for periodically severing bag lengths from the leading end of the tube, and means located in advance of the cutter for tucking in the corners of the leading end of the tube, comprising a forming plate having a slotted, triangular forward end, tucking blades swingable into the slotted end, means forming pivotal supports for the tucking blades, the axes of said supports being located at the vertices of the bases of the end of the forming plate and substantially in the leading edges of the respective tucking blades.

18. A structure as set forth in claim 17, characterized by means to support selectively any of a series of forming plates of different widths, and each having a slotted end portion of the same shape, and means to cause the tucking blades to enter into the same complemental relation with any selected plate of said series.

19. A structure as set forth in claim 17, characterized by means to support selectively any of a series of forming plates of different widths, means for adjusting the tucking blades into position to cooperate with the selected plate, and flexible operating connections for the tucking blades.

20. In a bag making machine, in combination, means for supplying a web of bag material and forming it into a tube, a bifurcated forming plate defining a plane of tube movement, means for intermittently advancing the tube, means for tucking in the corners of the leading end of the tube, forming a quadruplex fold by a movement parallel with said plane, a reciprocable cutter for severing bag lengths periodically from the leading end of the tube, and means operating the feeding means and the cutter in timed relation to cause a bag length to be severed while the tube is idle.

21. In a bag making machine, in combination, means for supplying a web of bag material and forming it into a tube, means defining a plane of tube movement, means for intermittently advancing the tube, a reciprocable cutter for severing bag lengths periodically from the leading end of the tube, and means operating the feeding means and the cutter in timed relation to cause a bag length to be severed while the tube is idle, said cutter comprising a pair of oppositely reciprocating blades, and the cutter operating means including a cam formed to cause the blades to stand well away from the plane of tube feeding at the beginning of a feeding step but to approach said plane as the feeding progresses.

22. In a bag making machine, in combination, means for feeding a tube of bag material intermittently, means operated synchronously with the feeding of the tube for turning back a tab on the tube, said turning means engaging the tube lightly, a cutter for periodically severing a bag length from the leading end of the tube while the bag length is engaged by the tab turning means, and means for gripping the severed blank and positively feeding it clear of the tab turning means.

23. In a bag making machine, in combination, means for feeding a tube of bag material intermittently, means operated synchronously with the feeding of the tube for turning back a tab on the tube, said turning means engaging the tube lightly, a cutter for periodically severing a bag length from the leading end of the tube while the bag length is engaged by the tab turning means, and means for gripping the severed blank and positively feeding it clear of the tab turning means, comprising a feed roller, a cooperating sector, and means for shifting the sector toward and from the feed roller.

24. In a bag making machine, in combination, means for feeding a tube of bag material intermittently, means operated synchronously with the feeding of the tube for turning back a tab on the tube, said turning means engaging the tube lightly, a cutter for periodically severing a bag length from the leading end of the tube while the bag length is engaged by the tab turning means, and means for gripping the severed blank and positively feeding it clear of the tab turning means, comprising a pair of cooperating feeding members, and means for holding said members apart during one period of the operating cycle and for making them effective to advance the blank when the blank is severed.

25. In a bag making machine, in combination, means for feeding a tube of bag material intermittently, means operated synchronously with the feeding of the tube for turning back a tab on the tube, said turning means engaging the tube lightly, a cutter for periodically severing a bag length from the leading end of the tube while the bag length is engaged by the tab turning means, and means for gripping the severed blank and positively feeding it clear of the tab turning means, comprising a feed roller, a cooperating sector, and means for holding the sector away from the feed roller until the tube has been fed to severing position and for shifting the sector into position to permit it to cooperate with the feed roller at a time in the cycle when the segment gap is opposite the roller.

26. In a bag making machine, in combination, means for advancing successive bag blanks each having at the leading end thereof a forwardly extending lower tab and a rearwardly extending upper tab, means for gumming both of the tabs and for tucking and gripping the lower tab, comprising a cylinder, a gumming bar fixedly carried by said cylinder, a tucking blade also carried by said cylinder, a gumming roller for applying gum to the gumming bar, a second cylinder operated in timed relation to the first, a gripper carried by the second cylinder, and means for radially reciprocating the tucking blade as it travels with its cylinder to cause it to escape engagement with the gumming roller but to be projected outward beyond the path of the gumming bar for tucking the lower tab into the gripper, and means for successively pressing the gummed surface of the lower tab against the blank, and the gummed surface of the upper tab upon the lower tab.

27. In a bag making machine, in combination, a cylinder, a gripper carried by the cylinder for gripping a tab at the leading end of a bag blank, a conveyor comprising a pair of laterally spaced narrow belts cooperative with the cylinder to feed the blank when it is released by the gripper, pulleys supporting the belts and running in synchronism with the cylinder, and a cylindrical segment carried by and between the pulleys and disposed substantially flush with the belts for cooperating with the cylinder to iron down the tab.

28. In a bag making machine, in combination, a conveyor adapted to advance successive bag blanks each having a rearwardly extending upper tab adjacent the leading end of the blank, said conveyor comprising a lower belt supported in a convex run over a considerable portion of its length in the direction of travel and a pair of narrow laterally spaced upper belts running in bearing relation to the lower belt, whereby the blank is advanced in a manner free from sharp bends, a tab folder insertable beneath said tab from behind and operable to fold the tab forward, while so advanced between said lower and upper belts, and means for reciprocating the tab folder to and fro along said convex run.

29. In a bag making machine, in combination, a conveyor adapted to advance successive bag blanks each having a rearwardly extending upper tab adjacent the leading end of the blank, said conveyor comprising a broad belt supported in a convex run over a considerable portion of its length in the direction of travel, and a pair of narrow laterally spaced opposed belts, whereby the blank is advanced in a manner free from sharp bends, and means for folding said tab as the blank is advanced by and between the upper and lower belts of the conveyor in said extended convex run, a carrier for said tab folding means mounted to rock about the center of said convex run, and means for oscillating said carrier.

30. In a bag making machine, in combination, a conveyor for advancing successive bag blanks each having a rearwardly extending upper tab adjacent the leading end of the blank, a forming plate, a folding plate, means operating the forming and folding plates to act cooperatively upon the blank to fold the tab about a predetermined line during the advance of the blank by the conveyor, and means for causing the folding plate to press against the folded tab and iron the same after the fold is formed.

31. In a bag making machine, in combination, a conveyor for advancing successive bag blanks each having a rearwardly extending upper tab adjacent the leading end of the blank, a forming plate, a folding plate, means operating the forming and folding plates to act cooperatively upon the blank to fold the tab about a predetermined line during the advance of the blank by the conveyor, and means causing the folding plate to gain on the blank while pressing against the folded tab and then to remain stationary in pressing relation to the tab while the blank is fed forward.

32. In a bag making machine, in combination, means for supplying a web of bag material and forming it into a tube, a cutter, means for intermittently feeding the tube past the cutter, means for operating the cutter periodically to sever a blank length from the tube, means in advance of the cutter for tucking in the leading corners of the tube to provide upper and lower tabs, means acting yieldingly on the tube beyond the cutter before severance of a blank and concurrently with the operation of intermittent tube feeding means to fold back the upper tab, means effective upon severance of a blank to advance the blank while the tube remains idle so that successive blanks are spaced out, means for gumming the tabs, means for folding back the lower tab, and means for folding forward the upper tab and for pressing the folded tabs.

33. In a bag making machine, in combination, a conveyor adapted to advance successive bag blanks each having a rearwardly extending upper tab adjacent the leading end of the blank, said conveyor comprising a broad belt and a pair of narrow laterally spaced opposed belts, a long series of relatively small rollers for supporting the broad belt and defining a convex run for the broad belt over a considerable portion of the length of the broad belt in the direction of the travel thereof whereby the blank is advanced in a manner free from sharp bends, and means for folding said tab as the blank is advanced by and between the upper and lower belts of the conveyor in said extended convex run.

34. In a machine for manufacturing satchel bottom bags, in combination, a plate for holding a bag tube flat and fully distended with its opposite faces flat and in spaced parallel relation, said plate having a triangular forward end portion formed with a slot intermediate its faces, and means for simultaneously folding the corners of the bag tube into said slot.

35. In a machine for forming satchel bottom bags, in combination, means for folding a web into tubular form, a slotted plate for holding opposite faces of the formed tube flat and in fully distended, spaced, parallel relation, means for tucking the corners of the forward end of the bag tube into the slot between said faces while the tube is maintained flat and fully distended, means for advancing the bag tube beyond said plate, and means for cutting off a blank length from the forward part of the bag tube in advance of the plate.

36. In a machine for forming satchel bottom bags, in combination a plate having parallel faces and parallel edges but including a forward portion of substantially isosceles, right triangular form having a slot extending between its faces and parallel to them, said plate serving positively to hold the bottom flaps of a bag tube to shape, and means for simultaneously bending in the forward corners of the bag tube into the slot as far as possible to form such flaps.

37. A machine for making bags which comprises, in combination, means for forming a succession of individual tubular blanks each with the corners at the forward end of the blank folded in to provide opposed upper and lower, substantially triangular end tabs, means for positively advancing each individual blank uninterruptedly along a definite path with the tabs leading, and means for yieldingly drawing one of the tabs forward out of said path to deflect it while the positive advance of the other tab and the blank body is continued, said blank advancing means including rotary members for pulling the deflected tab after the undeflected tab and pressing the deflected tab down flat against the blank body.

38. In a machine for making bags, in combination, means for advancing a web of bag material, means for forming the leading end of the web into a flat tube, means for folding in the edges of the tube at the forward corners of the tube simultaneously between the faces of the tube, each through substantially a right angle, said tube forming means including means for maintaining the faces of the tube in fully distended, spaced, substantially parallel, relation, during the operation of the folding means, to cause a pair of opposed, substantially triangular tabs to be formed on the forward end of the tube, and means for thereafter severing a bag length from the tube.

39. A machine for making bags which comprises means for advancing a web of bag material, means for forming the leading end of the web into a flat tube, means for folding in the edges of the tube at the forward corners of the tube simultaneously between the faces of the tube, each through substantially a right angle, said tube forming means including means for maintaining the faces of the tube in fully distended, spaced, substantially parallel relation, during the operation of the folding means to cause a pair of opposed, substantially triangular tabs to be formed on the forward end of the tube, means for severing a bag length from the tube, means for folding back one of the tabs onto the blank body, and means for thereafter folding the tab tips toward one another and uniting them in superposed relation.

ABRAHAM NOVICK.